(12) United States Patent
Lee et al.

(10) Patent No.: US 7,671,143 B2
(45) Date of Patent: Mar. 2, 2010

(54) FLAME RETARDANT POLYCARBONATE RESIN COMPOSITION HAVING GOOD IMPACT, HIGH HEAT RESISTANCE

(75) Inventors: Bong Jae Lee, Seoul (KR); Kyoung Tae Kim, Seoul (KR); Sung Sig Min, Seoul (KR)

(73) Assignee: Cheil Industries Inc., Gumi-si (KR)

( * ) Notice: Subject to any disclaimer, the term of this patent is extended or adjusted under 35 U.S.C. 154(b) by 268 days.

(21) Appl. No.: 11/678,112

(22) Filed: Feb. 23, 2007

(65) Prior Publication Data

US 2007/0155857 A1 Jul. 5, 2007

Related U.S. Application Data

(63) Continuation-in-part of application No. PCT/KR2006/005673, filed on Dec. 22, 2006.

(30) Foreign Application Priority Data

Dec. 30, 2005 (KR) .................. 10-2005-0136098
Dec. 21, 2006 (KR) .................. 10-2006-0131778

(51) Int. Cl.
*C08F 283/02* (2006.01)
(52) U.S. Cl. .............. 525/464; 524/117; 524/140; 524/141
(58) Field of Classification Search ............ 524/117, 524/140, 141; 525/67, 464
See application file for complete search history.

(56) References Cited

U.S. PATENT DOCUMENTS

| | | | |
|---|---|---|---|
| 4,948,837 A | 8/1990 | Wittmann et al. | |
| 5,252,693 A | 10/1993 | Ishihara et al. | |
| H1901 H * | 10/2000 | Mason | 49/471 |
| 6,127,465 A * | 10/2000 | Nodera | 524/125 |
| 6,369,142 B1 * | 4/2002 | Nodera et al. | 524/141 |
| 6,403,683 B1 * | 6/2002 | Kobayashi | 524/115 |
| 6,664,362 B2 * | 12/2003 | Kobayashi | 528/196 |
| 7,186,767 B2 * | 3/2007 | Seidel et al. | 524/127 |
| 7,220,790 B2 * | 5/2007 | Seidel et al. | 524/127 |
| 2001/0025082 A1 | 9/2001 | Park | |
| 2004/0063824 A1 | 4/2004 | Takagi et al. | |
| 2004/0106731 A1 | 6/2004 | Seidel et al. | |
| 2005/0038149 A1 | 2/2005 | Hashimoto et al. | |
| 2007/0213435 A1 | 9/2007 | Min et al. | |
| 2007/0213437 A1 * | 9/2007 | Nagatoshi | 524/146 |

FOREIGN PATENT DOCUMENTS

| | | |
|---|---|---|
| JP | 2000-086844 A | 3/2000 |
| JP | 2000-086845 A | 3/2000 |
| JP | 2000-086847 A | 3/2000 |
| JP | 2004-107506 A | 4/2004 |
| JP | 2004-210916 A | 7/2004 |
| KR | 10-2001-0019451 A | 3/2001 |
| KR | 10-2000-0049833 | 8/2001 |
| KR | 10-2001-76179 A | 8/2001 |
| KR | 10-2003-0030422 A | 4/2003 |
| KR | 10-2004-0090386 A | 10/2004 |
| KR | 10-2006-0037581 | 5/2006 |
| WO | 2007/001130 A1 | 1/2007 |

OTHER PUBLICATIONS

International Search Report in counterpart International Application No. PCT/KR2006/005673, mailed Mar. 22, 2007.
International Search Report in commonly owned International Application No. PCT/KR2006/002355, mailed on Aug. 21, 2006.
Office Action in commonly owned U.S. Appl. No. 11/683,321, mailed on Nov. 7, 2008.
Extended European Search Report in counterpart European Application No. 06835377, dated Aug. 6, 2009.
Extended European Search Report in commonly owned European Application No. 06768944, dated Aug. 4, 2009.
Database WPI Week 200714, Thomson Scientific, London, GB; AN 2007-135726, XP002538602 & KR 2006 037 581 A (Cheil Ind. Inc.) May 3, 2006, Abstract.

* cited by examiner

*Primary Examiner*—Peter Szekely
(74) *Attorney, Agent, or Firm*—Summa, Additon & Ashe, P.A.

(57) ABSTRACT

Disclosed herein is a flame retardant polycarbonate resin composition having high heat resistance and good impact resistance. The flame retardant polycarbonate composition is prepared by incorporating into a polycarbonate resin a silicon-based core-shell graft copolymer, in which a vinyl monomer is graft polymerized onto a rubber comprising about 20 to about 95% by weight of silicon, and optionally a phosphoric acid ester compound. The present invention can accordingly provide superior flame retardance while maintaining good impact resistance, high flowability and high heat resistance.

20 Claims, No Drawings

FLAME RETARDANT POLYCARBONATE RESIN COMPOSITION HAVING GOOD IMPACT, HIGH HEAT RESISTANCE

CROSS-REFERENCE TO RELATED PATENT APPLICATIONS

This non-provisional application is a continuation-in-part of PCT Application No. PCT/KR2006/005673, filed Dec. 22, 2006, pending, which designates the U.S., which is hereby incorporated herein by reference in its entirety, and which claims priority under 35 U.S.C. § 119(a) from Korean Patent Application No. 10-2005-0136098, filed Dec. 30, 2005, and Korean Patent Application No. 10-2006-0131778, filed on Dec. 21, 2006, each of which is also herein incorporated in its entirety by reference.

FIELD OF THE INVENTION

The present invention relates to a flame retardant polycarbonate resin composition having high heat resistance and good impact resistance.

BACKGROUND OF THE INVENTION

Flame retardant polycarbonate resins generally have good impact resistance. Accordingly, such resins have been widely used in automobile parts and electric or electronic products which require such properties, particularly parts requiring good flame retardance. Generally good flame retardance can be imparted to the polycarbonate resin using a halogen-containing compound as a flame retardant. This method has several advantages in that there is little deterioration in physical properties and it can easily provide flame retardance. However, because toxic gases harmful to a human body can be liberated upon combustion, the use of such a halogen-containing compound has been restricted in most countries in the world and thus the amount of such compounds used has been greatly reduced.

As one solution to overcome these problems, a phosphoric acid ester compound can be used as a flame retardant. In the case where a phosphoric acid ester compound is added to the polycarbonate resin, the flowability of the resin can improve, but the impact resistance and heat resistance of the resin can markedly decline. Thus, there still exists a problem in the application to products requiring high levels of heat resistance.

SUMMARY OF THE INVENTION

The present invention can provide a flame retardant polycarbonate resin composition with high heat resistance and good impact resistance. Exemplary embodiments of the flame retardant polycarbonate composition of the invention can include (A) about 75 to about 99 parts by weight of a thermoplastic polycarbonate resin; and (B) about 0.5 to about 15 parts by weight of a silicon-based core shell graft copolymer prepared by graft polymerization of a vinyl monomer onto a rubber containing about 20 to about 95% by weight of silicon.

The present invention can also provide a molded article prepared using the flame retardant thermoplastic resin composition.

In exemplary embodiments of the present invention, the flame retardant polycarbonate resin composition can further include (C) about 0.1 to about 10 parts by weight of a phosphoric acid ester compound in addition to the above-described flame retardant polycarbonate resin composition.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Hereinafter, each component of the thermoplastic resin composition according to exemplary embodiments of the present invention including (A) a polycarbonate resin, (B) a silicon-based core-shell graft copolymer prepared by graft polymerization of a vinyl monomer onto a rubber containing about 20 to about 95% by weight of silicon, and (C) a phosphoric acid ester compound, will be explained in more detail.

(A) Polycarbonate Resin

Methods for preparing a polycarbonate resin suitable for use in the present invention and methods of using polycarbonate resins in a thermoplastic resin composition are well known in the art and will be readily understood by the skilled artisan.

There is no particular limitation on the kind of the polycarbonate resin used so long as it is conventionally used in the art. The polycarbonate resin may be prepared by reacting dihydric phenol with a phosgene in the presence of a molecular weight regulator and a catalyst or by performing an ester-exchange reaction of dihydric phenol in the presence of a carbonate precursor such as diphenylcarbonate.

The dihydric phenol may be bisphenol, for example, 2,2-bis(4-hydroxyphenyl)propane(bisphenol A). Bisphenol A may be partially or wholly substituted with another dihydric phenol. Examples of suitable dihydric phenols in addition to bisphenol A include halogenated bisphenol such as hydroquinone, 4,4'-dihydroxydiphenyl, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfone, bis(4-hydroxyphenyl)sulfoxide, bis(4-hydroxyphenyl)ketone, bis(4-hydroxyphenyl)ether and 2,2-bis(3,5-dibromo-4-hydroxyphenyl)propane, as well as mixtures thereof.

The polycarbonate resin may be a homopolymer of polycarbonate, a copolymer of two or more kinds of dihydric phenols, or a mixture thereof.

Further, the polycarbonate resin may include linear polycarbonate, branched polycarbonate, polyester-carbonate copolymer, silicon copolymer polycarbonate, and the like.

The linear polycarbonate resin may be bisphenol A-based polycarbonate resin. The branched polycarbonate may be prepared by reacting a multifunctional aromatic compound such as trimellitic anhydride or trimellitic acid with dihydroxyphenol in the presence of a carbonate precursor. The polyester carbonate copolymer may be prepared by reacting difunctional carboxylic acid with dihydric phenol in the presence of a carbonate precursor.

The polycarbonate resin can be used in an amount of about 75 to about 99 parts by weight in the flame retardant thermoplastic composition of the present invention. If the content of the polycarbonate resin is lower than about 75 parts by weight, the impact resistance of the composition can deteriorate. Meanwhile, if the content of the polycarbonate resin is greater than about 99 parts by weight, the flame retardance of the composition can be lowered.

The flame retardant polycarbonate resin composition of the present invention may further include polyester resin, polyamide resin, polystyrene resin, polyolefin resin, polyacetal resin, polyphenylsulfide resin, styrene-containing graft copolymer resin, maleimide copolymer resin, and mixtures thereof, depending on the desired properties of the composition and its end use, in addition to the polycarbonate resin.

(B) Silicon-Based Core-Shell Graft Copolymer Prepared by Graft Polymerization of a Vinyl Monomer onto a Rubber Containing about 20 to about 95% by Weight of Silicon Methods for preparing a graft copolymer in the form of a silicon-based core-shell are well-known in the art and will be readily understood by a person skilled in the art.

The graft copolymer suitable for the present invention can have a structure in which a vinyl monomer is grafted onto a core part of the rubber, thus forming a rigid shell.

There is no particular limitation on the kind of the silicon-based core-shell copolymer used in the invention, and it may be prepared by conventional methods well-known in the art. For example, the silicon-based core-shell copolymer may be prepared by polymerizing a silicon-based rubber and then grafting one or more compounds selected from the group consisting of styrene, α-methylstyrene, halogen or alkyl substituted styrene, acrylonitrile, methacrylonitrile, $C_1$-$C_8$ methacrylic acid alkylester, $C_1$-$C_8$ acrylic acid alkylester, maleic anhydride, $C_1$-$C_4$ alkyl and phenyl N-substituted maleimide onto the rubber.

The $C_1$-$C_8$ methacrylic acid alkylester and $C_1$-$C_8$ acrylic acid alkylester belong to esters of methacrylic acid and acrylic acid, respectively, which are esters derived from monohydril alcohol having 1 to 8 carbon atoms. Particular examples thereof may include methacrylic acid methylester, methacrylic acid ethylester and methacrylic acid propylester.

The rubber content of the silicon-based core-shell graft copolymer can be in the range of about 30 to about 90% by weight. If the rubber content is lower than about 30% by weight, the flame retardance of the composition can deteriorate. Meanwhile, if the rubber content exceeds about 90% by weight, the impact resistance of the composition can decline.

The silicon-based rubber core may be made of cyclosiloxane, examples of which may include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrosiloxane, octaphenylcyclotetrasiloxane, and the like, and mixtures thereof. The silicon-based rubber may be prepared by mixing the siloxane with one or more curing agents. Examples of suitable curing agents may include trimethoxymethylsilane, triethoxyphenylsilane, tetramethoxysilane, tetraethoxysilane, and the like, and mixtures thereof.

The silicon content of the rubber part, which constitutes a core part of the composition in the present invention, can be in the range of about 20 to about 95% by weight. If the silicon content of the rubber part is lower than about 20% by weight, the flame retardance of the composition can be hindered, which can make it difficult to acquire levels of flame retardance required for products. Further, if the silicon content is greater than about 95% by weight, the impact resistance of the composition can be hampered, which may make it difficult to obtain impact strength required for products.

In addition, the silicon content to a total silicon-based core-shell graft copolymer may be in the range of about 6 to about 85.5% by weight. For example, the silicon content to a total silicon-based core-shell graft copolymer may be in the range of about 50 to about 85% by weight in terms of flame retardance and impact strength.

In the present invention, the silicon-based core-shell graft copolymer can be used in an amount of about 0.5 to about 15 parts by weight. If the content of the silicon-based core-shell graft copolymer is lower than about 0.5 parts by weight, its effect on impact strength may be insignificant, and if the content thereof is greater than about 15 parts by weight, mechanical strength such as tensile strength, flexural modulus and the like may be lowered.

(C) Phosphoric Acid Ester Compound

The present invention may further employ a phosphoric acid ester compound according to needs.

In accordance with one exemplary embodiment of the present invention, the phosphoric acid ester compound used as a flame retardant in the present invention may be a phosphoric acid ester compound represented by the following Formula 1 or a mixture thereof. The compound of Formula 1 can be a phosphoric acid ester compound in the type of an oligomer which is derived from a $C_6$-$C_{30}$ aryl or alkyl substituted $C_6$-$C_{30}$ aryl derivative. The $C_6$-$C_{30}$ aryl or alkyl substituted $C_6$-$C_{30}$ aryl derivative can be derived from resorcinol, hydroquinone or bisphenol-A.

Exemplary compounds include compounds of Formula 1 below, as well as mixtures of such compounds:

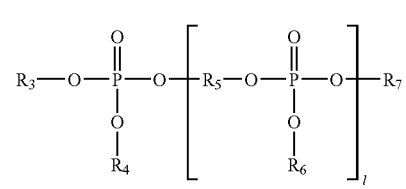

[Formula 1]

wherein $R_3$, $R_4$, $R_6$ and $R_7$ are each independently $C_6$-$C_{20}$ aryl or alkyl substituted $C_6$-$C_{20}$ aryl; $R_5$ is $C_6$-$C_{30}$ aryl or alkyl substituted $C_6$-$C_{30}$ aryl derivative; l is a number average degree of polymerization; and the mean value of l is in the range of about 0 to about 3.

In the above Formula 1, $R_3$, $R_4$, $R_6$ and $R_7$ can each be independently phenyl or alkyl substituted phenyl wherein the alkyl is selected from the group consisting of methyl, ethyl, isopropyl, t-butyl, isobutyl, isoamyl and t-amyl, for example, each can be independently phenyl or methyl, ethyl, isopropyl or t-butyl substituted phenyl.

The phosphoric acid ester-based flame retardant used in the present invention can be an aryl-derived phosphoric acid ester in the type of a monomer or an oligomer having the l mean value of about 1 to about 3 in Formula 1. The phosphoric acid ester compound having the l value of 0, 1, 2 or 3 may be used alone or in combination as a mixture. The phosphoric acid ester-based flame retardant can be used in the form of a mixture in which ester compounds are previously mixed in the polymerization process or a mixture of the phosphoric acid ester compounds having different l values after each of phosphoric acid ester compounds is prepared individually.

The phosphoric acid ester compound having the l mean value of 0 used in the present invention may be a single compound selected from the group consisting of tri(alkylphenyl)phosphate, di(alkylphenyl)monophenylphosphate, diphenylmono(alkylphenyl)phosphate and triphenylphosphate, and mixtures thereof.

The methods for preparing the phosphoric acid ester compound of Formula 1 according to the invention are not limited, but the compound is generally prepared by reacting phosphorous oxychloride ($POCl_3$) with an aromatic alcohol having a $R_3$ substituted naphthyl group and an aromatic alcohol having a $R_4$ substituted phenyl group at a temperature ranging from about 50° C. to about 200° C. simultaneously or successively. The synthetic product prepared by the above method may contain a certain amount of triarylphosphate depending on the reaction conditions, and may be used without or after purification. The phosphoric acid ester compound of Formula 1 according to the present invention may be prepared by using a catalyst, which may be exemplified by metal chloride such as aluminium chloride ($AlCl_3$), magnesium chloride ($MgCl_2$) or zinc chloride($ZnCl_2$).

In the present invention, the phosphoric acid ester compound can be used in an amount of about 0.1 to about 10 parts by weight. If the amount of the phosphoric acid ester compound used is lower than about 0.1 parts by weight, the flowability of the composition may deteriorate, and if the amount thereof is greater than about 10 parts by weight, both heat resistance and impact resistance may be lowered.

The polycarbonate resin composition of the present invention may include other additives depending on its purpose. The resin composition may further include one or more additives selected from the group consisting of an inorganic additive, a heat stabilizer, an antioxidant, a light stabilizer, a flame retardant, a lubricant, a pigment and a dye in an amount of about 50 parts by weight or below. The use of an inorganic additive such as a glass fiber, a carbon fiber, talc, silica, mica, alumina or the like can improve physical properties such as mechanical strength and heat deflection temperature.

The present invention also provides a molded article prepared by using the flame retardant polycarbonate resin composition. The flame retardant polycarbonate resin composition according to the present invention may be prepared by a conventional method well-known in the art. For example, the composition may be prepared in the form of a pellet by mixing the components of the invention and other additives together, and then extruding through an extruder.

The flame retardant polycarbonate resin composition according to the present invention can be useful in molding various products, particularly the fabrication of electric or electronic products such as TV housings and office automation equipment, battery chargers and the like, which require good flame retardance and impact strength.

Embodiments of the present invention will now be described in more detail with reference to the following examples. However, the examples are given for the purpose of illustration and are not to be construed as limiting the scope of the invention.

EXAMPLES

In order to measure physical properties of a composition, flame retardant polycarbonate resin compositions are prepared in Examples 1 to 3 and Comparative Examples 1 to 6 by the following components: (a) a polycarbonate resin, (b1) a silicon-based core-shell graft copolymer having high silicon content, (b2) a silicon-based core-shell graft copolymer having low silicon content, and (c) a phosphoric acid ester compound.

(a) Polycarbonate Resin

PANLITE L-1250WP having a weight average molecular weight of 25,000 g/mol which is manufactured by TEIJIN Limited (Japan) is used as a bisphenol-A type linear polycarbonate resin.

(b1) Silicon-based Core-shell Graft Copolymer

KANEACE MR-01 having a silicon content of 60 to 70% by weight which is manufactured by KANEKA Corporation (Japan) is used as a silicon-based core-shell graft copolymer.

(b2) Silicon-based Core-shell Graft Copolymer

Metablen S-2001 having a silicon content of 15% by weight or less which is manufactured by MRC (Japan) is used as a silicon-based core-shell graft copolymer.

(c) Phosphoric Acid Ester Compound

PX-200 manufactured by Daihachi Co. Ltd. (Japan) is used as a phosphoric acid ester compound.

The amount of each component used in Examples 1 to 3 and Comparative Examples 1 to 6 is set as in the following Table 1.

TABLE 1

|  |  |  | Examples | | | Comparative Examples | | | | | |
|---|---|---|---|---|---|---|---|---|---|---|---|
|  |  |  | 1 | 2 | 3 | 1 | 2 | 3 | 4 | 5 | 6 |
| Components | Polycarbonate(a) |  | 96 | 94 | 87 | 100 | 94 | 88 | 80 | 94 | 87 |
|  | Silicon-based core-shell graft copolymer | (b1) | 4 | 4 | 10 | — | — | — | — | — | — |
|  |  | (b2) | — | — | — | — | — | — | — | 4 | 10 |
|  | Phosphoric acid compound(c) |  | — | 2 | 3 | — | 6 | 12 | 20 | 2 | 3 |
| Physical properties | MFR flowability | ASTM D1238 | 19 | 24 | 26 | 18 | 25 | 27 | 29 | 22 | 25 |
|  | Injection flow length |  | 13 | 17 | 22 | 11 | 21 | 23 | 25 | 16 | 20 |
|  | VST heat resistance | ASTM D1525 | 143 | 140 | 138 | 146 | 128 | 112 | 100 | 140 | 135 |
|  | IZOD | ASTM D256 | 75 | 75 | 80 | 11 | 9 | 8 | 6 | 69 | 76 |
|  | IZOD(−30° C.) |  | 34 | 34 | 45 | 10 | 7 | 6 | 2 | 31 | 32 |
|  | UL flame retardance | Combustion time(sec) | 21 | 20 | 12 | 130 | 54 | 52 | 20 | 84 | 112 |
|  |  | Grade | V-0 | V-0 | V-0 | Fail | Fail | Fail | V-0 | Fail | Fail |

[Measurement of Physical Properties]

These components are mixed in the amount as shown in Table 1 and the mixture is extruded through a twin screw extruder with Φ=45 mm to prepare the resin composition in a pellet form. The resin pellets are dried at 110° C. for 3 hours or more and injected by a 10 oz injection molding machine at a processing temperature ranging from 250 to 300° C. and a mold temperature ranging from 60 to 90° C. to prepare a test sample for assessing physical properties.

(1) MFR Flowability

Before the preparation of a test sample, melt flow rate is measured at 250° C. according to ASTM D1238. It is determined by measuring the amount of a resin flowed out from the test sample using a 10 kg weight for 10 minutes.

(2) Injection Flow Length

In order to assess flowability of a resin appearing in the course of the actual manufacturing process, a flow length of a resin is measured under the condition of applying a constant pressure while maintaining a temperature of a mold having a thickness of 1 mm installed in the injection molding machine to 60° C. An injection temperature is set up to 300° C. which is a basic working condition for polycarbonate.

(3) VST Heat Resistance

VST heat resistance of each test sample is measured according to ASTM D1525 under constant load of 5 kgf.

(4) IZOD Impact Resistance

Notched IZOD impact resistance (¼") of each test sample is measured according to ASTM D256.

(5) UL Flame Retardance

Flame retardance is measured by using a test sample having 1.5 mm in thickness according to UL-94. Total combustion time is determined by summing up the first and the second combustion time of five test samples.

Table 1 demonstrates that mixing a silicon-based core-shell graft copolymer having high silicon content with a polycarbonate resin in a proper ratio as shown in Example 1 can provide high flame retardance of a level of UL-94 V-0 while achieving superior heat resistance and impact resistance. Table 1 also demonstrates that further using a phosphoric acid ester compound in a proper ratio as in Examples 2 and 3 can provide high flowability while maintaining good impact resistance and improved physical properties having more stable flame retardance.

On the other hand, Comparative Example 1 which does not include a silicon-based core-shell graft copolymer having high silicon content cannot provide sufficient flame retardance and impact strength. Further, it can be seen from Comparative Examples 2 to 4 that using a phosphoric acid ester compound alone and increasing its content can slightly increase flame retardance, and in the case of using an excess thereof, can secure flame retardance at a level of UL94 V-0, but with a significant decrease in impact resistance and heat resistance. Also, Comparative Examples 5 and 6 using a silicon-based core-shell graft copolymer having low silicon content exhibit a lowering of flame retardance, whereas its impact resistance is improved.

As apparent from the foregoing, according to the present invention, the polycarbonate resin composition exhibiting superior flame retardance while maintaining high heat resistance and good impact resistance can be prepared by incorporating into a polycarbonate resin a silicon-based core-shell graft copolymer in which a vinyl monomer is graft polymerized onto a rubber containing about 20 to about 95% by weight of silicon.

Therefore, the polycarbonate resin composition prepared by the present invention can be useful in the production of various molded products such as portable mobile communication equipment, precision electric and electronic parts, automobile precision parts, and the like which require good flame retardance, heat resistance and impact strength.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A flame retardant polycarbonate resin composition comprising:
    (A) about 75 to about 99 parts by weight of a thermoplastic polycarbonate resin; and
    (B) about 0.5 to about 15 parts by weight of a silicon-based core-shell graft copolymer in which a vinyl monomer is graft polymerized onto a rubber core comprising about 20 to about 95% by weight of silicon.

2. The flame retardant polycarbonate resin composition according to claim 1, wherein the silicon-based core-shell graft copolymer (B) in which a vinyl monomer is graft polymerized onto a rubber core comprising about 20 to about 95% by weight of silicon is prepared by polymerizing a silicon-based rubber and then grafting one or more compounds selected from the group consisting of styrene, α-methylstyrene, halogen substituted styrene, alkyl substituted styrene, acrylonitrile, methacrylonitrile, $C_1$-$C_8$ methacrylic acid alkylester, $C_1$-$C_8$ acrylic acid alkylester, maleic anhydride, $C_1$-$C_4$ alkyl N-substituted maleimde, and phenyl N-substituted maleimide onto the rubber.

3. The flame retardant polycarbonate resin composition according to claim 1, wherein the rubber content of the silicon-based core-shell graft copolymer in which a vinyl monomer is graft polymerized onto a rubber core comprising about 20 to about 95% by weight of silicon is in the range of about 30 to about 90% by weight.

4. The flame retardant polycarbonate resin composition according to claim 1, wherein a core part of the silicon-based rubber comprises a cyclosiloxane selected from the group consisting of hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrosiloxane, octaphenylcyclotetrasiloxane, and mixtures thereof.

5. A flame retardant polycarbonate resin composition comprising:
    (A) about 75 to about 99 parts by weight of a thermoplastic polycarbonate resin; and
    (B) about 0.5 to about 15 parts by weight of a silicon-based core-shell graft copolymer comprising about 50 to about 85% by weight of silicon.

6. The flame retardant polycarbonate resin composition according to claim 1, further comprising (C) about 0.1 to about 10 parts by weight of a phosphoric acid ester compound.

7. The flame retardant polycarbonate resin composition according to claim 6, wherein the phosphoric acid ester compound (C) comprises a phosphoric acid ester compound represented by the following Formula 1 or a mixture thereof:

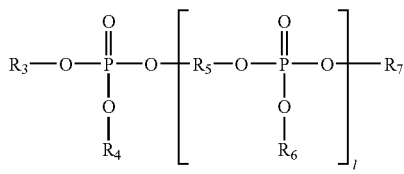

[Formula 1]

wherein $R_3$, $R_4$, $R_6$ and $R_7$ are each independently $C_6$-$C_{20}$ aryl; $R_5$ is $C_6$-$C_{30}$ aryl or alkyl substituted $C_6$-$C_{30}$ aryl derivative; l is a number average degree of polymerization; and the mean value of l is in the range of about 0 to about 3.

8. The flame retardant polycarbonate resin composition according to claim 7, wherein the phosphoric acid ester compound of Formula 1 has a l mean value of about 0 and comprises a compound selected from the group consisting of tri(alkylphenyl)phosphate, di(alkylphenyl)monophenylphosphate, diphenylmono(alkylphenyl)phosphate and triphenylphosphate, and mixtures thereof.

9. The flame retardant polycarbonate resin composition according to claim 1, further comprising one or more resins selected from the group consisting of polyester resin, polyamide resin, polystyrene resin, polyolefin resin, polyacetal resin, polyphenylsulfide resin, styrene-containing graft copolymer resin and maleimide copolymer resin, in addition to the thermoplastic polycarbonate resin.

10. The flame retardant polycarbonate resin composition according to claim 1, which further comprises one or more additives selected from the group consisting of an inorganic additive, a heat stabilizer, an antioxidant, a light stabilizer, a flame retardent, a lubricant, a pigment and a dye.

11. A molded article prepared by using a flame retardant polycarbonate resin composition comprising:
(A) about 75 to about 99 parts by weight of a thermoplastic polycarbonate resin; and
(B) about 0.5 to about 15 parts by weight of a silicon-based core-shell graft copolymer in which a vinyl monomer is graft polymerized onto a rubber core comprising about 20 to about 95% by weight of silicon.

12. The flame retardant polycarbonate resin composition according to claim 1, wherein said composition is halogen free.

13. The flame retardant polycarbonate resin composition according to claim 1, comprising a flame retardant consisting essentially of said silicon-based core-shell graft copolymer (B) and optionally a phosphoric acid ester compound.

14. The flame retardant polycarbonate resin composition according to claim 1, wherein the rubber of said core of said silicon-based core-shell graft copolymer (B) consists essentially of a silicon based rubber.

15. The flame retardant polycarbonate resin composition according to claim 1, comprising about 0.5 to less than 10 parts by weight of said silicon-based core-shell graft copolymer.

16. The flame retardant polycarbonate resin composition according to claim 1, comprising about 0.5 to about 4 parts by weight of said silicon-based core-shell graft copolymer.

17. The flame retardant polycarbonate resin composition according to claim 5, wherein said composition is halogen free.

18. The flame retardant polycarbonate resin composition according to claim 5, comprising a flame retardant consisting essentially of said silicon-based core-shell graft copolymer (B) and optionally a phosphoric acid ester compound.

19. The flame retardant polycarbonate resin composition according to claim 5, wherein the core of said silicon-based core-shell graft copolymer (B) comprises rubber consisting essentially of a silicon based rubber.

20. The flame retardant polycarbonate resin composition according to claim 5, comprising about 0.5 to less than 10 parts by weight of said silicon-based core-shell graft copolymer.

* * * * *

(12) EX PARTE REEXAMINATION CERTIFICATE (8607th)
United States Patent
Lee et al.

(10) Number: US 7,671,143 C1
(45) Certificate Issued: Oct. 4, 2011

(54) FLAME RETARDANT POLYCARBONATE RESIN COMPOSITION HAVING GOOD IMPACT, HIGH HEAT RESISTANCE

(75) Inventors: Bong Jae Lee, Seoul (KR); Kyoung Tae Kim, Seoul (KR); Sung Sig Min, Seoul (KR)

(73) Assignee: Cheil Industries, Inc., Gongdan-Dong, Gumi-Si, Gyeongsangbuk-Do (KR)

Reexamination Request:
No. 90/011,393, Dec. 17, 2010

Reexamination Certificate for:
Patent No.: 7,671,143
Issued: Mar. 2, 2010
Appl. No.: 11/678,112
Filed: Feb. 23, 2007

Related U.S. Application Data

(63) Continuation-in-part of application No. PCT/KR06/05673, filed on Dec. 22, 2006.

(51) Int. Cl.
*C08F 283/02* (2006.01)

(52) U.S. Cl. ......... 525/464; 524/117; 524/149; 524/141

(58) Field of Classification Search ............ 525/464
See application file for complete search history.

(56) References Cited

U.S. PATENT DOCUMENTS

2005/0038149 A1  2/2005  Hashimoto et al.

FOREIGN PATENT DOCUMENTS

JP  2003-268225  9/2003

*Primary Examiner*—Stephen Stein

(57) ABSTRACT

Disclosed herein is a flame retardant polycarbonate resin composition having high heat resistance and good impact resistance. The flame retardant polycarbonate composition is prepared by incorporating into a polycarbonate resin a silicon-based core-shell graft copolymer, in which a vinyl monomer is graft polymerized onto a rubber comprising about 20 to about 95% by weight of silicon, and optionally a phosphoric acid ester compound. The present invention can accordingly provide superior flame retardance while maintaining good impact resistance, high flowability and high heat resistance.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-20 are cancelled.

* * * * *